United States Patent [19]

Tiemstra

[11] 3,969,514

[45] July 13, 1976

[54] COMBINATION FOOD PRODUCT HAVING DISCRETE PHASES OF NUT SPREAD AND OF A SECOND FOOD SPREAD

[75] Inventor: Peter J. Tiemstra, La Grange, Ill.

[73] Assignee: Swift & Company, Chicago, Ill.

[22] Filed: July 17, 1974

[21] Appl. No.: 489,146

[52] U.S. Cl. ................................. 426/90; 426/93; 426/103; 426/249; 426/571; 426/573; 426/633
[51] Int. Cl.² .................... A23L 1/06; A23L 1/36; A23L 1/38
[58] Field of Search ............. 426/90, 106, 199, 209, 426/249, 362, 363, 93, 103, 571, 573, 577, 578, 629, 633

[56] References Cited
UNITED STATES PATENTS 3,552,980   1/1971   Cooper et al. ..................... 426/90

*Primary Examiner*—A. Louis Monacell
*Assistant Examiner*—R. A. Yoncoskie
*Attorney, Agent, or Firm*—Edward T. McCabe; Charles E. Bouton; Raymond M. Mehler

[57] ABSTRACT

A spreadable combination food product includes a discrete spreadable nut component phase containing about 60–98% ground nuts, having a fat content of about 50–65% by weight, and a water content of about 2–6% by weight, in combination with a discrete phase of a second food spread either of normal commercial composition or in which the water activity thereof has been lowered. The combination food product contains about 25–75% by weight of the spreadable nut component phase. The process includes either or both of raising the water activity and the oil content of the spreadable nut component, while the second food spread remains unmodified, or only slightly modified through lowering of the water activity. The two phases of the food product remain discrete for extended periods of time.

11 Claims, No Drawings

COMBINATION FOOD PRODUCT HAVING DISCRETE PHASES OF NUT SPREAD AND OF A SECOND FOOD SPREAD

This invention relates to new food products and the method of making them. The products are combinations of a spreadable nut component in discrete relationship with a second food spread which may be a gelled fruit spread, a marshmallow spread, or a flavored starch-based spread. The instant method includes either or both of the steps of raising the water activity and raising the oil content of the nut component, and may or may not include lowering the water activity of the second food spread.

Nut butters or nut spreads are frequently consumed along with gelled fruit spreads such as jams, jellies, preserves and marmalades, with marshmallow spreads or with fresh fruits. Often, combinations of these two food items are spread onto bread, crackers, or the like. Since these spreadable components are packaged separately, one must open or handle at least two containers, remove a portion of food from each, and then combine the separate products in the desired ratio. It is ordinarily difficult, as well as inconvenient, to blend the selected portions of the foods; therefore, the prospective consumer enjoys several advantages when the desired food products are packaged in the proper ratio within the same container.

In the past, the packaging of a combination product such as contemplated here wherein the components are in contiguous contact has not met with total success since during normal storage periods, there occurs moisture diffusion from the second food spread phase into the nut component phase. This moisture diffusion causes an unsightly dark band at the interface between the phases and results in the texture of the nut component becoming soggy and objectionably heavy, while that of the second food spread can become grainy and crystalline.

Some workers in the art generally believe that this unsightly dark band at the interface is the result of the well-known Maillard-type browning reaction. This reaction is believed to be a reaction of amino acids with carbohydrates (both reactants being present in nut products) which reaction is initiated by moisture.

In Colby, et al., U.S. Pat. No. 3,278,314, a combination of peanut butter and jelly, jam, or marshmallow is said to be kept stable by modifying the jelly, jam or marshmallow to reduce its moisture content and to maintain a critical sugar relationship between the two components by the addition of a low molecular weight carbohydrate to the jelly, jam or marshmallow. Cooper, et al., U.S. Pat. No. 3,552,980 attempts to solve the moisture diffusion problem in peanut butter-sweet aqueous spread combinations by utilizing a sweet aqueous spread that is extensively modified over the ordinary commercially distributed sweet aqueous spread, such as jelly, jam, or the like.

The prior art attempts such as those of Colby and Cooper to lessen the water diffusion problem require extensive modification of the second food spread component, thereby lessening palatability and general consumer acceptance. Bundus, U.S. Pat. No. 3,582,358 attempted to overcome this difficulty by providing a peanut butter and jelly, jam or marshmallow combination that does not require any alteration of the jelly portion, but calls for the addition of a complex water-in-oil emulsifier to a peanut butter.

It is, therefore, an object of this invention to have a multi-layered or multi-phased food product, combining pleasing appearance with convenience and economy by offering two or more food components that remain discrete in a single container.

It is also an object of the present invention to have a food product in which there is provided a spreadable nut component combined with a second food spread, which product will not develop an unsightly appearance during normal storage periods.

Another object of this invention is to provide a food product having two or more discrete phases in which the nut component has a water content and/or a fat content greater than that of commercially marketed nut butters or nut spreads.

A further object of this invention is the process of preparing a nut component having a water content of about 2–6% and a fat content of about 50–65% by weight combining such nut component with a second food spread of an unmodified commercial composition, the nut component and the second food spread being packaged as discrete phases.

A still further object of the present invention is a process for producing a food product having discrete phases, including a gelled fruit spread as a second food spread which is modified by reducing its water activity to not less than 0.55, the nut component being modified through one or more of the steps of increasing its fat content, increasing its water content, or decreasing its nut content.

An additional object of this invention is a process for producing a food product having discrete phases, one phase being a spreadable nut component having one or more of a relatively high water or fat content or a relatively low nut content, and another phase being a flavored starch-based spread.

The discretely phased products of the present invention include a nut component that has been formulated to inhibit moisture transfer into the nut component from the other component, a second food spread. The process of the present invention includes preparing a spreadable nut component including one or more of the steps of adding water such that the water content thereof is relatively high, adding oil such that the oil content thereof is relatively high, or including a quantity of nuts such that the nut content thereof is relatively low. This nut component is combined in discrete phases with a second food spread and packaged for shelf storage at room temperature.

Additional objects, if not set forth specifically herein, will be readily apparent to those skilled in the art from the detailed description of the invention which follows.

It has been determined that the production of a nut butter or spread and second food spread combination in the same package has been unsatisfactory because moisture from the second food spread transfers into the nut butter or spread after a relatively short period of time, causing browning through what is thought to be a Maillard-type reaction. I have now discovered that the rate of moisture transfer is directly proportional to the difference between the water activity of the second food spread phase and that of the nut component phase. I have found that this moisture transfer is inversely proportional to the amount of fat in the nut component phase. To lessen moisture transfer, the water activity difference between the phases is lowered and/or the fat content of the nut component phase is raised in the present invention.

Many commercially marketed products that may be utilized as the second food spread phase have a relatively large water activity on the order of 0.85 to 0.90. The water activity of normal, commercially marketed peanut butter is usually less than 0.15, roughly corresponding to an approximate water content of 0.5% by weight of the nut component. This difference between the water activities of the second food spread and of the nut component may be lowered in accordance with the present invention by utilizing a nut butter or a nut spread having a water content in the range of about 2 to 6% by weight, which corresponds to an approximate water activity range of 0.40 to 0.70. Thus the difference between the respective water activities is reduced relative to prior commercial teachings. It has been determined that a water content in the spreadable nut component that exceeds about 6% by weight is not desirable, this being the level at which browning is initiated.

Commercially marketed peanut butter has a fat or oil content of from about 43 to 50% by weight. The spreadable nut component of the present invention, in addition to or in lieu of being adjusted to relatively high water activity, can also be adjusted to a relatively high oil or fat content of from about 50% to about 65% by weight. The high fat content retards moisture transfer between the phases. When this high fat content is combined with the previously described high water content of the spreadable nut component, an especially superior moisture retarding effect is achieved.

In addition, the nut content of the nut component may be different from that of commercial peanut butter. To obtain an especially high fat content, it is necessary to have a nut content lower than that of prior art nut butters. This is particularly important if water, sweeteners, salt and other flavor enhancers are added to the product. The nut content of the nut component can be within the approximate range of from about 60 to 98% by weight. When the nut content is greater than 90% by weight and the fat content is 55 weight percent or less, the nut component is a nut butter. When the nut content is 90% or less or the fat content is greater than 55%, the component is a nut spread. The term spreadable nut component used herein refers to either or both of a nut butter or a nut spread as just defined.

The combination food product contains approximately 25 to 75 weight percent of the spreadable nut component. The spreadable nut component is an intimately mixed composition of minute particles of protein and carbohydrate suspended in an oil base that is spreadable and which contains significant amounts of ground nuts, for example roasted peanuts, glandless cottonseed or soybeans. The spreadable nut component may also include ingredients such as natural or hydrogenated, saturated or unsaturated fats or oils, peanut oil, butter, or margarine. The spreadable nut component will also contain water and a relatively small quantity of salt, generally not more than 1.5% by weight of the nut component.

The second food spread may be a marshmallow spread. The marshmallow spread may be a combination of ingredients including some but not all of the following: any sweetener (such as sucrose, dextrose, invert sugar, corn syrup, fructose, or any other natural sweetener); gelatin, egg albumin, any whipping agent (such as non-fat soybean hydrolysate or milk protein), and water.

The second food spread may be a flavored spreadable starch gel including a gelling starch such as corn starch, tapioca starch, or any industrially prepared pre-cooked gelling starches, also including any one or a combination of any sweetener (such as sucrose, dextrose, fructose, corn syrup, honey, glucose, brown sugar, or molasses) plus water and flavorings, if desired (which may be either natural or artificial agents having any flavor such as banana, vanilla, cinnamon, non-acid fruits and the like, or any other desired flavoring agent). This spread has a consistency and texture that resembles pudding.

The second food spread may also be a gelled fruit spread, preferably having a normal commercial water content of approximately 30 to 35 weight percent. The gelled fruit spread includes any sugar, any food acid such as citric acid, pectin or any other gelling agent, any fruit flavoring agent, and glycerine. For example, the sugar may be dextrose, glucose, sucrose, lactose, fructose, or the like. The fruit flavor may be any flavor, such as grape, apple, raspberry, loganberry, boysenberry, apricot, currant, strawberry, plum, blackberry, banana, or the like.

The term second food spread when used in this disclosure refers to any one of the marshmallow spread, the flavored spreadable starch gel, or the gelled fruit spread described in the previous paragraphs. The second food spread can be unmodified in its normal commercial water content, which can be as high as approximately 30 to 35 weight percent, corresponding to a water activity range of about 0.85 to 0.90. An alternative, but not an essential, feature of the invention is the reduction of the water activity of the second food spread to not lower than about 0.55.

The term water activity used herein characterizes the physical property of a solute or mixture of solutes in an aqueous solution and can be used interchangeably with terms such as osmotic pressure and equilibrium relative humidity. As used herein, water activity is precisely defined as the relative humidity of the adjacent atmosphere at equilibrium, expressed as a decimal.

The spreadable nut component is prepared by combining ground nuts, an edible mineral or vegetable oil, salt, and added water. Prevention of water migration in the combined food product of the present invention is improved by not including or by lowering the amount of some of the humectants often found in nut butters or spreads, such as a sugar, corn syrup solids, honey, sweeteners, and additional salt.

More particularly, in making the spreadable nut component, ground nuts are prepared by milling nuts in a conventional apparatus, the amount of ground nuts added being approximately 60 to 98% by weight of the total nut component. Additional oil or fat may be added as peanut oil, vegetable oil, margarine, butter or the like, so that the oil content of the final nut component is within the approximate range of from about 50 to about 65% by weight. Also, water may be added to achieve a water content of the nut component of about 2 to 6% by weight. The preparation of the nut component is accomplished at a temperature of about 130° to 190°F.

If a marshmallow spread is to be utilized as the second food spread, it is prepared and processed in accordance with a method such as the following. A syrup is prepared by heating or boiling to dissolve in water sweeteners (such as sucrose, dextrose, invert sugar, corn syrup, fructose, or any other natural sweetener) thereby forming a solution of about 70 to 75% solute in water, and adding to this solution prewetted gelling and whipping agents (such as gelatin, sugar, dry egg albumin, non-fat soybean hydrolysate, or milk protein). The temperature should be high enough to dissolve and liquify the ingredients but not so high as to denature the egg albumin, if used. The moisture content of the marshmallow syrup should be at the desired level for the finished product. The material can be whipped in any conventional equipment with or without cooling to obtain an overrun of 100 to 400% of original volume. The aerated product will be layered or swirled with the nut component in the manner described herein at a temperature not to exceed 100°F.

When the second food spread is prepared as a spreadable starch-based gel, the gelling starch is blended with any one or a combination of the sweeteners mentioned previously. Sufficient water is added by heating or boiling to prepare a smooth spread of 80 to 85% solids content. If desired, there is then blended in any natural or artificial flavoring agent such as those listed above.

When the second food spread is to be a gelled fruit spread, it is prepared by boiling sugar, a fruit acid and water to form a sugar solution. Fruit pectin or some other gelling agent is presoaked in water with a sugar, and the presoak is added to the boiling sugar solution until the pectin is dissolved, after which is added any fruit flavoring agent, such as a fruit juice, and glycerine or a similar compound. The temperature is then lowered to a point suitable for filling but preferably not so low as to promote gelation. Generally, incipient setting takes place at a temperatures below 170°F.; however, when the partially set solution is cooled with stirring to a temperature within the range about 90° to 150°F.; it will pour and set to a firm, clear, gelled product.

The combined food product can be produced by any number of methods. One such method is the filling of a container with alternate quantities of the spreadable nut component and of the second food spread. If this method of filling is used, the ingredients must be preconditioned so that they set up quickly. Generally, this may be done by either blowing a cold blast of gas, such as air or nitrogen, over successive quantities of each product immediately after pouring into the container, or by supercooling the ingredients prior to pouring. For example, the nut component may be supercooled in a heat exchanger such as a Votator at a temperature between about 70° and 100°F. so that it sets within a few seconds. Further, the second food spread can be made to set within 30 seconds if also subjected to supercooling conditions similar to those produced by a heat exchanger such as in a Votator, where heat is exhausted rapidly by thin-film agitation. Temperatures are determined by the composition of the second food spread, but generally the temperature may be reduced 10° to 20° toward the normal setting temperature with a resultant quick set when removed from the supercooling conditioner.

Various means may be used to combine the spreadable nut component and the second food spread so that they are in contiguous association yet possess a definite and distinct configuration. In one embodiment of the invention, a manufacturing line is set up in which there is, in order, the nut component heat exchanger drawing from a supply kettle of fluid nut component, and a second food spread heat exchanger drawing from a supply kettle of hot second food spread material. The nut component and the second food spread flow from their respective heat exchangers to filling machines in such a fashion that a quantity of nut component is poured into a jar followed by a quantity of the second food spread and then by a quantity of the nut component, and so forth, until the desired number of quantities are filled into the jar. Between the nut component filling apparatus and the succeeding second food spread filling apparatus may be chill means to chill the quantity of second food spread before the product being produced receives the next quantity of nut component. The packages are capped and labeled by means of conventional equipment.

As an alternative method, one may set up a packaging line such as that described in the preceding paragraph, but in which the output of each individual heat exchanger flows to a filling machine having filling spouts designed so that the second food spread and the spreadable nut component may flow concurrently into the package. Different patterns may be set up based upon the design of the spout utilized. For example, a double spout having one cylinder within another may be utilized so that the second food spread flows through the inner cylinder with the nut component flowing through the outer cylinder, thereby producing a package having a center of the second food spread. Another design consists of a filling spout in which a large tube contains a number of smaller tubes within it. The second food spread flows through the smaller tubes and is surrounded in each instance by a flow of the nut composition. This method produces a finished product with multiple vertical segments of the second food spread. In addition, the finished package can be modified further by rotating the container as it is being filled, to provide a twisted configuration. In regard to this method, various designs can be produced by changing the shape and size of the filling spouts as well as modifying flow direction of either one of the food components when combined with modifying the motion of the apparatus, i.e., rotating the container or the like.

A third embodiment that is illustrative of the possibilities for combining the food components incorporates a system wherein independent heat exchangers drawing from independent supply kettles bring the output of the two heat exchangers together into the same effluent line. The second food spread line flows into the nut component line through multiple tubing. The nut component and second food spread flow together, then they flow to a rotating vane where a twist or swirl of the second food spread segments is obtained within the nut component. The nut component and second food spread combination thus formed then flows to a conventional filling machine wherein the combined product is filled into containers such as jars.

In this connection, one embodiment of the packaged edible products of this invention may resemble the product shown in U.S. Pat. No. 3,117,871. Two other embodiments of the packaged edible products of this invention may resemble the products illustrated in U.S. Pat. No. 3,552,980. Other final product configurations or methods for combining into the discrete phases are possible and it is not intended that the invention be restricted to these three illustrative embodiments nor to the aforementioned descriptive material.

The following examples are presented to illustrate the invention. It will be understood that the specific embodiments and illustrations should not be taken in any manner as limiting the invention as defined in the appended claims.

EXAMPLE I

A peanut spread was prepared by preparing an intimate mixture of 87.0% by weight of ground peanuts, 2.0% by weight hydrogenated vegetable oil, 1.0% by weight salt, 6.0% by weight peanut oil, and 4.0% by weight water. This peanut spread was containerized into glass jars, in contiguous contact with an unmodified commercially marketed jelly having a moisture content of 32% and a water activity of 0.87, to form a combined peanut spread and jelly food product. The jars were stored at room temperature. No discoloration of the peanut spread or liquid migration was observed until after 4 months had elapsed. Even then, evidence of water migration was slight.

EXAMPLE II

A peanut spread was prepared in accordance with Example I and a jelly was also prepared. A sugar composition was prepared by mixing together and boiling to 236°F. ingredients including 393 grams of sugar, 2.1 grams of citric acid, and 100 grams of water. A mixture of 4.4 grams of pectin, 6.6 grams of dextrose and 88 grams of water was allowed to soak for 15 minutes and then added to the boiled sugar mixture previously prepared. Also prepared was a blend of 52.8 grams of glycerine and 36.8 grams of grape juice. After the pectin mixture had dissolved in the boiled sugars, the grape blend was added thereto. The jelly composition thus produced was combined with the peanut spread of and containerized in the manner described in Example I. After this combination food product was stored at ambient temperature for 6 months it showed only slight discoloration and was still considered to be an acceptable food product, the flavor and texture of the combination food product still being satisfactory.

EXAMPLE III

A peanut butter was prepared by mixing together 97.2% by weight of ground peanuts, 1.8% by weight hydrogenated vegetable oil, and 1.0% by weight salt, thereby forming an intimate mixture. This peanut butter was utilized with the jelly prepared in accordance with Example II and containerized as in Example I. Upon room temperature storage for 2 months, only slight browning began to be observable.

EXAMPLE IV

An intimate mixture of 92.7% by weight ground peanuts, 2.0% by weight hydrogenated vegetable oil, 1.0% by weight salt, and 4.3% by weight peanut oil was prepared so as to form a peanut butter. This peanut butter was combined with the jelly of Example II in the manner described in Examplle I. The containerized food product, upon storage at ambient temperatures, was observed approximately 5 weeks after containerization. At that time only initial signs of slight discoloration and water migration were noticed.

EXAMPLE V

A peanut spread was prepared utilizing 60% dark roasted peanuts, 2.0% hydrogenated vegetable oil, 1.0% salt, 32.0% peanut oil, and 5.0% corn syrup (64 DE, 22% moisture). This was filled with the unmodified jelly composition of Example I. No discoloration was noted and the flavor was acceptable after 8 months of storage.

EXAMPLE VI

A peanut spread was prepared consisting of 65% (60.1% fat and 5.9% moisture) dark roasted peanuts, 2.0% hydrogenated vegetable oil, 1.0% salt, 32.0% sweet creamy 92 score butter. This peanut spread was filled with the unmodified jelly composition as in Example I. No discoloration was noted and the flavor was acceptable after 8 months of storage.

EXAMPLE VII

A peanut spread was prepared consisting of 60% dark roasted peanuts, 2.0% hydrogenated vegetable oil, 1.0% salt, 32.0% high-grade margarine, and 5.0% sucrose. This spread analyzed 57.6% oil, and 5.8% moisture. The spread was filled with the unmodified jelly composition of Example I. No discoloration was noted and the flavor was acceptable after 8 months of storage.

EXAMPLE VIII

A water migration test was conducted. This test was run with a jelly prepared as follows. 393 grams of sugar, 2 grams of citric acid, and 100 grams of water were mixed and boiled to 236°F. Allowed to soak for 15 minutes was a mixture of 5.0 grams pectin, 6.0 grams dextrose, and 88 grams of water, which soaked mixture was added to the boiling sugar solution. A mixture of 52.8 grams glycerine and 36.8 grams grape juice was added to the previously prepared solution after the pectin therein had dissolved.

First prepared was a peanut butter of substantially commercial composition, containing 98.2% by weight ground peanuts and 1.8% by weight hydrogenated vegetable oil. By analysis, this prior art peanut butter had a water content of 0.7% by weight and a fat content of 47.1% by weight. Also prepared was a peanut spread according to the present invention having, by analysis, 5.7% by weight water and 50.1% by weight fat. This peanut spread was made from 89.1% by weight ground peanuts, 2.8% hydrogenated vegetable oil, 1.0% salt, 4.0% oil, and 4.1% water.

Approximately 10 grams of each of the prior art peanut butter (identified as "A") and of the instant peanut spread (identified as "B") and of the jelly prepared in accordance with this example were placed in separate aluminum cups approximately 50 mm. in diameter and 15 mm. in depth. After both the peanut butter and the peanut spread had set up, the cup containing same was inverted and placed on top of a cup containing the jelly, such that the peanut butter A was in contiguous contact with the jelly, and the peanut spread B was also in contiguous contact with the jelly. A self-adhering tape was used to hold the pairs of cups in place and to prevent as much as possible any moisture loss to the atmosphere. From time to time these samples were taken apart and weighed to measure the moisture gain or loss. The following data show the results of this comparison test.

| | PEANUT BUTTER "A" AND JELLY CONTIGUOUS CONTACT TEST: | |
| --- | --- | --- |
| Time (Days) | Peanut Butter "A" Weight GAIN (Grams) | Jelly Weight Loss (Grams) |
| 1 | 0.08 | 0.25 |
| 6 | 0.15 | 0.42 |

-continued

PEANUT BUTTER "A"
AND JELLY CONTIGUOUS CONTACT TEST:

| Time (Days) | Peanut Butter "A" Weight GAIN (Grams) | Jelly Weight Loss (Grams) |
|---|---|---|
| 15 | 0.25 | 0.71 |
| 34 | 0.32 | 1.4 |

PEANUT SPREAD "B"
AND JELLY CONTIGUOUS CONTACT TEST:

| Time (Days) | Peanut Spread "B" Weight LOSS (Grams) | Jelly Weight Loss (Grams) |
|---|---|---|
| 5 | 0.09 | 0.30 |
| 14 | 0.19 | 0.33 |
| 33 | 0.29 | 0.33 |

The above data show that peanut butter A, which contains no added moisture or added fat content quickly gained moisture and continued to gain moisture throughout the period of the test. Contrary to this, the peanut spread B, containing a water content and a fat content in accordance with this invention actually exhibited a slight loss in moisture in both the jelly and peanut spread phases, indicating some escape to atmosphere, but no moisture transfer from one phase to the other. In addition, the amount of moisture loss in the jelly phase which was combined with peanut butter A is significantly greater than the moisture loss observed in the jelly phase which was combined with the peanut spread B, further indicating that a portion of the moisture in the jelly in contiguous contact with peanut butter A was transferred into the peanut butter A.

I claim:

1. A combination food product comprising a spreadable nut component phase, a second food spread phase of a marshmallow spread, a jelly, a jam, a preserve, or a marmalade, said second food spread phase having a normal water content between approximately 20 to 35 weight %, which corresponds to a water activity range of about 0.55 to 0.90, said spreadable nut component being an intimately mixed composition of minute particles of protein and carbohydrate suspended in an oil base, said spreadable nut component having water added thereto and thus a high water content of about 2% to 6% by weight thereof, which corresponds to a water activity range of about 0.40 to 0.70, a high oil content of about 55% to 65% by weight thereof, and a ground nuts content of about 60% to 90% by weight thereof, said high oil content and said high water content inhibiting the rate of moisture transfer from the second food spread phase into the spreadable nut component phase, said spreadable nut component phase being in contiguous contact with said second food spread phase and packaged as a combination food product wherein the spreadable nut component phase and the second food spread phase are discrete with respect to each other.

2. The combination food product of claim 1, wherein the spreadable nut component phase comprises about 25 to 75% by weight of the combined food product.

3. The combination food product of claim 1, wherein the second food spread phase has a water activity of approximately 0.85 to 0.90.

4. The combination food product of claim 1, further comprising having a salt content of not more than 1.5% by weight of the nut component phase.

5. A method for forming a food product combination of a spreadable nut component phase and a second food spread phase comprising: preparing a second food spread selected from the group consisting of a marshmallow spread, a jelly, a jam, a preserve, or a marmalade; formulating said second food spread to have a normal water content between approximately 20 to 35 weight %, which corresponds to a water activity range of about 0.55 to 0.90; preparing a spreadable nut component to have a combined content of ground nuts, oil and water to inhibit the rate of moisture infusion from the second food spread by formulating such spreadable nut component to have a high oil content and an added, high water content, said moisture inhibiting amounts being about 60 to 90% by weight of ground nuts, about 55 to 65% by weight of oil, and about 2 to 6% by weight of water, which corresponds to a water activity range of about 0.40 to 0.70; combining the second food spread and the spreadable nut component into a combined food product having discrete phases of the second food spread of the spreadable nut component, said phases being in contiguous contact with each other; and containerizing the combined food product.

6. The method of claim 5, wherein the second food spread is prepared as having a water activity of from about 0.85 to 0.90.

7. The method of claim 5, further comprising preparing the nut component by mixing together at about 130° to 190°F. said water, said oil, said ground nuts, and from 0 to about 1.5% by weight salt, and cooling the mixture to about 70° to 100°F. to form a flowable supercooled nut component.

8. The method of claim 5, wherein the combined food product has a nut component content of from about 25 to 75% by weight.

9. The method of claim 7, the preparing of the second spread comprising: boiling a sugar, a fruit acid and water to form a sugar solution; presoaking a gelling agent with a sugar and water; mixing the presoak thus formed with the boiling sugar solution until the gelling agent is dissolved; adding thereto a fruit flavoring agent and glycerine, said glycerine being added in an amount less than 10% by weight of the second food spread; and cooling the flavored product to about 90° to 150°F. to form a supercooled flowable second food spread.

10. The method of claim 9, further comprising introducing the supercooled flowable nut component and the supercooled flowable second food spread into a container by means of one or more filling spouts, and thereafter sealing the container.

11. The method of claim 5, wherein the second food spread is a marshmallow spread prepared by:
  prewetting a gelling and whipping agent with cooled water;
  preparing a sweetening solution consisting of 70 to 75 percent solute by heating a sweetening agent in water;
  combining the prewetted gelling and whipping agent with the sweetening solution while same is still warm; and
  whipping the combined prewetting agent and sweetening solution to an overrun of 100 to 400 percent.

* * * * *